(12) United States Patent
Hori et al.

(10) Patent No.: US 11,458,866 B2
(45) Date of Patent: Oct. 4, 2022

(54) SEAT SLIDER DEVICE

(71) Applicant: TOYOTA BODY SEIKO CO., LTD., Takahama (JP)

(72) Inventors: Yoshihisa Hori, Takahama (JP); Takayuki Ogasawara, Takahama (JP); Rui Kawai, Takahama (JP); Seiki Yamamoto, Takahama (JP)

(73) Assignee: TOYOTA BODY SEIKO CO., LTD., Takahama (JP)

( * ) Notice: Subject to any disclaimer, the term of this patent is extended or adjusted under 35 U.S.C. 154(b) by 228 days.

(21) Appl. No.: 16/539,042

(22) Filed: Aug. 13, 2019

(65) Prior Publication Data
US 2020/0062147 A1    Feb. 27, 2020

(30) Foreign Application Priority Data
Aug. 27, 2018 (JP) .............................. JP2018-157991

(51) Int. Cl.
*B60N 2/08* (2006.01)
(52) U.S. Cl.
CPC ........... *B60N 2/085* (2013.01); *B60N 2/0818* (2013.01)
(58) Field of Classification Search
CPC .. B60N 2/0705; B60N 2/0812; B60N 2/0818; B60N 2/1831; B60N 2/0837; B60N 2/0843; B60N 2/085; B60N 2/0856; B60N 2/0831; B60N 2/0875
See application file for complete search history.

(56) References Cited

U.S. PATENT DOCUMENTS 5,806,825 A     9/1998  Couasnon
6,036,157 A *   3/2000  Baroin ................. B60N 2/0705
                                                        248/429

(Continued)

FOREIGN PATENT DOCUMENTS

CN     104507742 A     4/2015
CN     105658474 A     6/2016
(Continued)

OTHER PUBLICATIONS

Mar. 1, 2022 Office Action issued in Japanese Patent Application No. 2018-157991.
(Continued)

*Primary Examiner* — Jonathan Liu
*Assistant Examiner* — Guang H Guan
(74) *Attorney, Agent, or Firm* — Oliff PLC (57) ABSTRACT

A seat slider device may include: a lower rail attachable to a body of a vehicle and including grooves arranged in a for direction of the lower rail; an upper rail attachable to a seat and slidably engaging with the lower rail; and a lock lever including a plurality of protrusions configured to engage with the grooves, supported by the upper rail to be swingable in a direction bringing the protrusions close to the grooves and in a direction bringing the protrusions away from the grooves, and biased in the direction bringing the protrusions close to the grooves. A portion of the lock lever between a pivot of the lock lever and the protrusions may have elasticity such that the portion flexes in the direction bringing the protrusions close to the grooves and in the direction bringing the protrusions away from the grooves.

3 Claims, 11 Drawing Sheets

(56) References Cited

U.S. PATENT DOCUMENTS

| | | | | |
|---|---|---|---|---|
| 6,688,574 | B2* | 2/2004 | Okazaki | B60N 2/0705 248/424 |
| 6,902,235 | B2* | 6/2005 | Rohee | B60N 2/085 297/341 |
| 7,229,117 | B2* | 6/2007 | Okuda | B60N 2/0818 296/64 |
| 7,314,204 | B2* | 1/2008 | Kohmura | B60N 2/0705 248/430 |
| 8,770,534 | B2* | 7/2014 | Nakamura | B60N 2/085 248/429 |
| 9,315,119 | B2* | 4/2016 | Yamada | B60N 2/0818 |
| 9,701,218 | B2* | 7/2017 | Satoh | B60N 2/0818 |
| 9,783,083 | B2* | 10/2017 | Sato | B60N 2/0725 |
| 9,783,084 | B2* | 10/2017 | Kumagai | B60N 2/0715 |
| 9,827,877 | B2* | 11/2017 | Jahner | B60N 2/0818 |
| 9,914,373 | B2* | 3/2018 | Sato | B60N 2/0705 |
| 10,160,351 | B2* | 12/2018 | Sugimoto | B60N 2/123 |
| 10,556,521 | B2* | 2/2020 | Hoshihara | B60N 2/085 |
| 10,940,775 | B2* | 3/2021 | Tamaki | B60N 2/085 |
| 2016/0221477 | A1 | 8/2016 | Satoh et al. | |
| 2020/0062147 | A1* | 2/2020 | Hori | B60N 2/0705 |

FOREIGN PATENT DOCUMENTS

| | | |
|---|---|---|
| JP | H09-104266 A | 4/1997 |
| JP | 2013-052839 A | 3/2013 |
| JP | 2015-003593 A | 1/2015 |
| JP | 2016-047660 A | 4/2016 |
| JP | 2018-052401 A | 4/2018 |
| JP | 2018-062245 A | 4/2018 |
| JP | 2018-062246 A | 4/2018 |

OTHER PUBLICATIONS

Jun. 30, 2022 Office Action issued in Chinese Patent Application No. 201910721430.5.

* cited by examiner

SEAT SLIDER DEVICE

CROSS-REFERENCE TO RELATED APPLICATION

This application claims priority to Japanese Patent Application No. 2018-457991 filed on Aug. 27, 2018, the contents of which are hereby incorporated by reference into the present application.

TECHNICAL FIELD

The teaching disclosed herein relates to a seat slider device which slides a seat of a vehicle.

BACKGROUND

A seat slider device for sliding a seat is provided with a lower rail attachable to a body of a vehicle and an upper rail attachable to a lower portion of a seat. The upper rail is slidably engaged with the lower rail.

The seat slider device is provided with a lock mechanism configured to fix the upper rail relative to the lower rail. A general lock mechanism is configured of grooves provided on the lower rail and a lock lever supported by the upper rail (for example, Japanese Patent Application Publication No. 2013-52839). The grooves of the lower rail are configured of a plurality of slits in some cases, while they are configured of a plurality of holes in other cases. A plurality of protrusions configured to engage with the grooves is provided at a distal end of the lock lever. The lock lever is supported by the upper rail to be swingable in a direction bringing the protrusions away from the grooves and in a direction bringing them dose to the grooves. The lock lever is biased in the direction bringing the protrusions close to the grooves. This biasing three maintains the upper rail in a locked state. When a user presses the lock lever in a predetermined direction, the protrusions separate away from the grooves, by which the lock is released and the upper rail becomes slidable relative to the lower rail. That is, the seat becomes slidable. When the user let go of the lock lever, the lock lever swings in the opposite direction to the predetermined direction and the protrusions engage with the grooves, by which the upper rail is locked relative to the lower rail.

SUMMARY

The lock lever swings between a state in which the protrusions at the distal end thereof engage with the grooves of the lower rail and a state in which the protrusions are separated away from the grooves. In the state in which the protrusions are separated away from the grooves, the distal end of the lock lever contacts a member opposed to the grooves. A cross-sectional area of the seat slider device is preferably small. Especially, a distance from a bottom plate of the lower rail to a top plate of the upper rail is preferably small, however, a space which, allows the protrusions to separate sufficiently away from the grooves is required between the grooves and the bottom plate of the lower rail. Since a direction along which the plurality of protrusions is arranged becomes nonparallel to the grooves in an unlocked state, if the space is narrow, not all of the plurality of protrusions can sufficiently be separated from the grooves, as a result of which protrusion(s) close to the grooves interfere with the grooves and sliding performance of the upper rail might thereby be deteriorated. En the seat slider device of Japanese Patent Application Publication No. 2013-52839, a notch is provided in a side of the distal end of the lock lever opposed to the bottom plate of the lower rail. A swingable range of the lock lever can be expanded by a range of the notch, thus a height of the seat slider device may be reduced by that range. However, there is a limit to the expansion of the swingable range by the notch. The disclosure herein provides a technique which achieves both reduction of a cross-sectional area of a seat slider device and securement of a clearance between grooves of a lower rail and protrusions of a lock lever in an unlocked state by a structure that is different from a notch.

A seat slider device disclosed herein may comprise a lower rail attachable to a body of a vehicle, an upper rail attachable to a seat, and a lock lever. The lower rail may include grooves arranged in a longitudinal direction of the lower rail. The upper rail may slidably engage with the lower rail. The lock lever may include a plurality of protrusions configured to engage with some of the grooves and may be supported by the upper rail to be swingable in a direction bringing the protrusions close to the grooves and in a direction bringing the protrusions away from the grooves. The lock lever may be biased in the direction bringing the protrusions close to the grooves. A portion of the lock lever between a pivot of the lock lever and the protrusions may have elasticity such that the portion flexes in the direction bringing the protrusions close to the grooves and in the direction bringing the protrusions away from the grooves. The protrusions of the lock lever are arranged along the direction in which the grooves of the lower rail are arranged.

In the seat slider device disclosed herein, the portion of the lock lever between the pivot of the lock lever and the protrusions has elasticity such that the portion flexes in the direction bringing the protrusions close to the grooves and in the direction bringing the protrusions away from the grooves. In an unlocked state, this elasticity allows the lock lever to swing even further after the lock lever has had its distal end contact a portion of the lower rail opposed to the grooves (groove-opposing portion). When the lock lever swings in the direction bringing the protrusions away from the grooves, firstly the distal end of the lock lever contacts the groove-opposing portion. That is, when seen along a pivot direction of the lock lever, an arrangement of the protrusions at the distal end of the lock lever forms an angle relative to a rail longitudinal direction. This angle becomes smaller as the lock lever elastically flexes to a greater degree, and in the end, the arrangement of the protrusions becomes approximately parallel to the rail longitudinal direction. That is, an entirety of the arrangement of the protrusions makes surface contact with the aforementioned groove-opposing portion and becomes approximately parallel to the grooves of the lower rail. Accordingly, a sufficient clearance is ensured between the plurality of protrusions and the grooves. The elasticity which the lock lever has may be set to a degree that allows the lock lever to flex by a normal operation by a user. In other words, the lock lever may swing in the direction bringing the protrusions away from the grooves by a load that is equal to or under a tolerable upper limit load such that the protrusions contact the groove-opposing portion, the lock lever flexes and positions the protrusions and the grooves to be approximately parallel to each other, and the clearance may be provided between the grooves and the protrusions. The seat slider device disclosed herein may bring the arrangement of the protrusions to be approximately parallel to the grooves by employing a material having elasticity for the lock lever, thus a cross-sectional area (especially a height) of the seat slider device may be reduced. That is, the seat slider device disclosed herein achieves both reduction of the cross-sectional area of the seat slider device and securement of the clearance between the grooves of the lower rail and the protrusions of the lock lever in the unlocked state.

In the seat slider device disclosed herein, the lock lever may be supported such that the pivot thereof is directed along a vertical direction relative to a bottom plate of the lower rail. In this case, the cross-sectional area (especially a width) of the seat slider device can be reduced while the clearance between the grooves of the lower rail and the protrusions of the lock lever is ensured in the unlocked state.

Details and further improvements of the art disclosed herein will he described in the following DETAILED DESCRIPTION.

DETAILED DESCRIPTION

Figure 1:
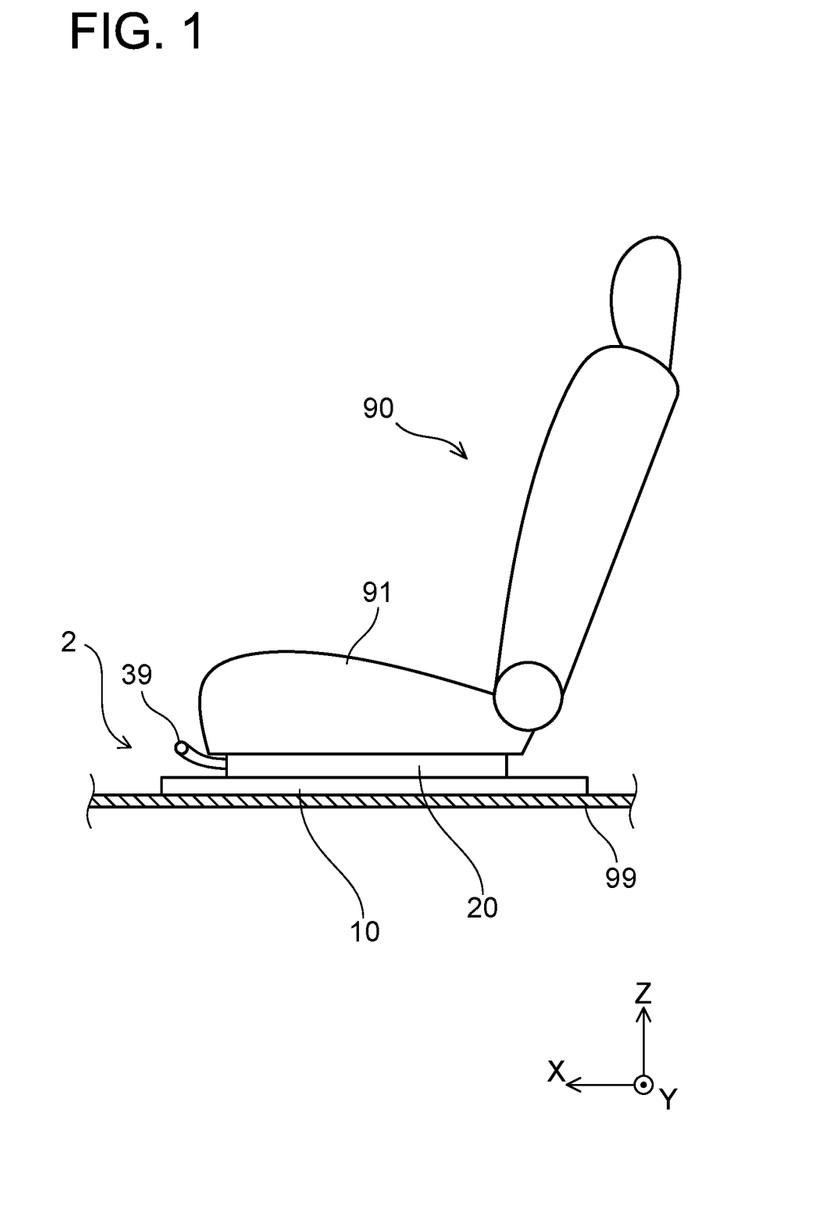
FIG. 1 is a side view of a seat slider device of a first embodiment.

A seat slider device 2 of an embodiment will be described with reference to the drawings. FIG. 1 shows a side view of the seat slider device 2 attached to a vehicle. The seat slider device 2 includes a lower rail 10 and an upper rail 20. The upper rail 20 is slidably attached to the lower rail 10. The lower rail 10 is fixed to a floor panel 99 of the vehicle. The upper rail 20 is attached to a lower portion of a seat cushion 91 of a seat 90. A control lever 39 coupled to a lock lever (to be described later) extends from a front end of the upper rail 20. When a user pulls up the control lever 39, lock of the upper rail 20 relative to the lower rail 10 is released, by which the upper rail 20 becomes slidable. That is, the seat 90 becomes slidable. An X direction in a coordinate system of the drawings corresponds to a rail longitudinal direction of the lower rail 10 and the upper rail 20. A Y direction corresponds to a rail short direction thereof. A +Z direction in the coordinate system of the drawings indicates an upward direction. For the sake of description, a +X direction will be termed "front" and a −X direction will be termed "rear". The meaning of each axis in the coordinate system applies to all the other drawings hereinbelow.

Figure 2A:
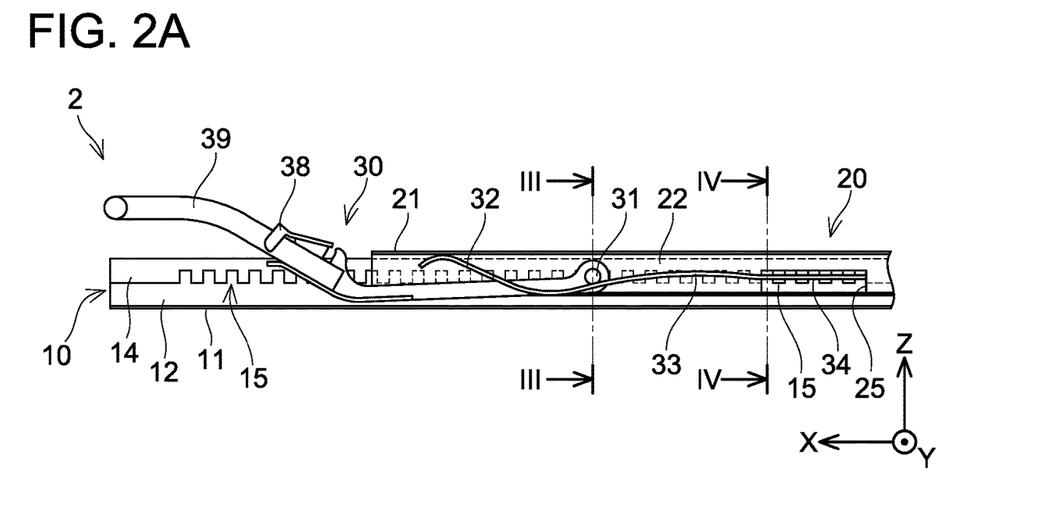
FIG. 2A is a partial side view of the seat slider device with rails shown in their cross-sections.
Figure 2B:
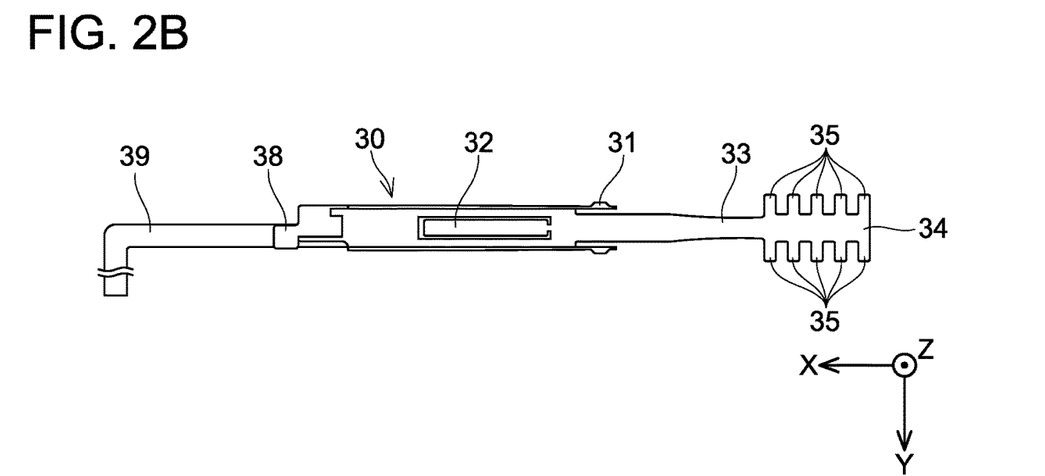
FIG. 2B is a plan view of a lock lever.
Figure 3:
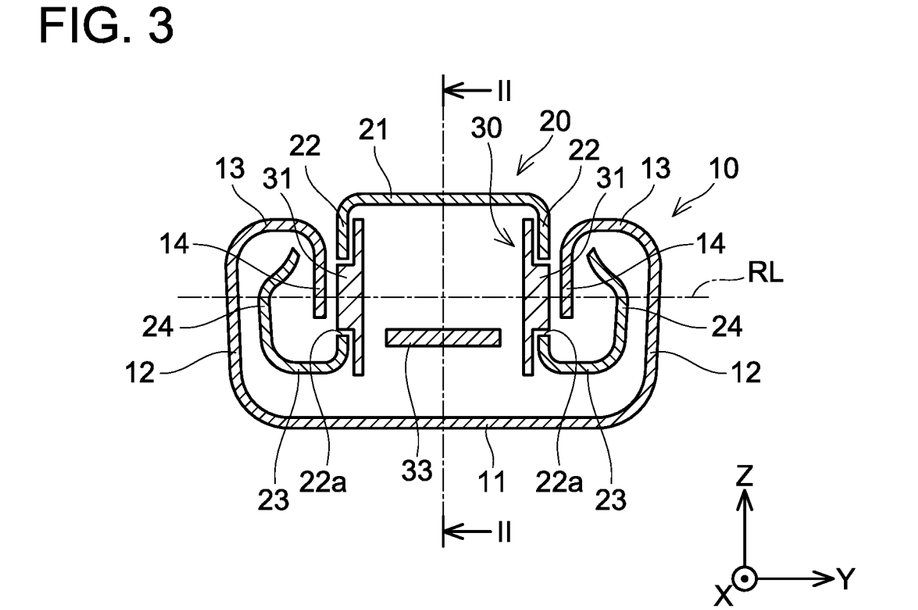
FIG. 3 is a cross-sectional view along a line III-III in FIG. 2A.

FIG. 2A shows a partial side view of the seat slider device 2 with a part thereof shown in a cross-section. FIG. 2B is a plan view of a lock lever 30. FIG. 3 shows a cross-sectional view along a line III-III in FIG. 2A.

Firstly, shapes of the lower rail 10 and the upper rail 20 will be described with reference to FIG. 3. The lower rail 10 is provided with a bottom plate portion 11 to he attached to a body of the vehicle, a pair of outer vertical plate portions 12, a pair of upper plate portions 13, and a pair of inner vertical plate portions 14. The pair of outer vertical plate portions 12 respectively extends upward from both ends of the bottom plate portion 11 in the rail short direction (Y direction in the drawings). The pair of upper plate portions 13 laterally extends respectively from upper ends of the outer vertical plate portions 12 toward a center in the rail short direction. The pair of inner vertical plate portions 14 extends downward respectively from inner ends of the upper plate portions 13. The pair of inner vertical plate portions 14 opposes each other. The outer vertical plate portions 12 and the inner vertical plate portions 14 are approximately parallel to each other.

The upper rail 20 is provided with a top plate portion 21 to be fixed to the seat cushion 91 (FIG. 1), a pair of side plate portions 22, a pair of lower plate portions 23, and a pair of arm plate portions 24. The pair of side plate portions 22 respectively extends downward from both ends of the top plate portion 21 in the rail short direction. The pair of lower plate portions 23 extends respectively from lower ends of the side plate portions 22 outward in the rail short direction. The pair of arm plate portions 24 extends upward respectively from outer ends of the lower plate portions 23. Each of the pair of side plate portions 22 faces corresponding one of the pair of inner vertical plate portions 14 of the lower rail 10. Each of the pair of arm plate portions 24 is located in a space between its corresponding outer vertical plate portion 12 and inner vertical plate portion 14 of the lower rail 10. Although not shown, a plurality of ball bearings is interposed between the upper rail 20 and the lower rail 10. Since the ball bearings are interposed, the upper rail 20 smoothly slides relative to the lower rail 10.

In the cross section of FIG. 3, a through hole 22a is provided in each of the pair of side plate portions 22 of the upper rail 20. The lock lever 30 is arranged between the pair of side plate portions 22, and axial protrusions 31 of the lock lever 30 are engaged with the through holes 22a. The lock lever 30 is configured to swing about a center line of the through holes 22a (a pivot line RL).

FIG. 2A shows cross sections of the lower rail 10 and the upper rail 20 along a line II-II in FIG. 3. In FIG. 2A, the lock lever 30 is depicted in a side view. As shown in FIG. 2A, grooves 15 that are arranged along the rail longitudinal direction (X direction) are provided in each of the inner vertical plate portions 14 of the lower rail 10. The grooves 15 are arranged so as to define a profile which protrudes downward and is recessed upward. A window 25 is provided at a part of each side plate portion 22 of the upper rail 20, and the grooves 15 can be seen through one of the windows 25 in FIG. 2A.

Figure 4:
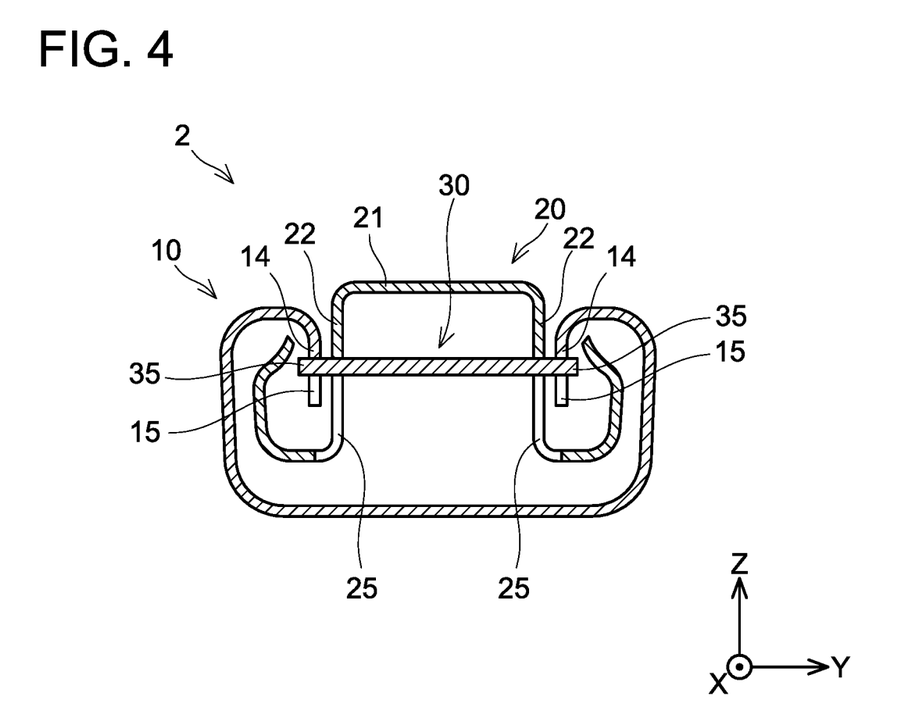
FIG. 4 is a cross-sectional view along a line IV-IV in FIG. 2A.
Figure 5:
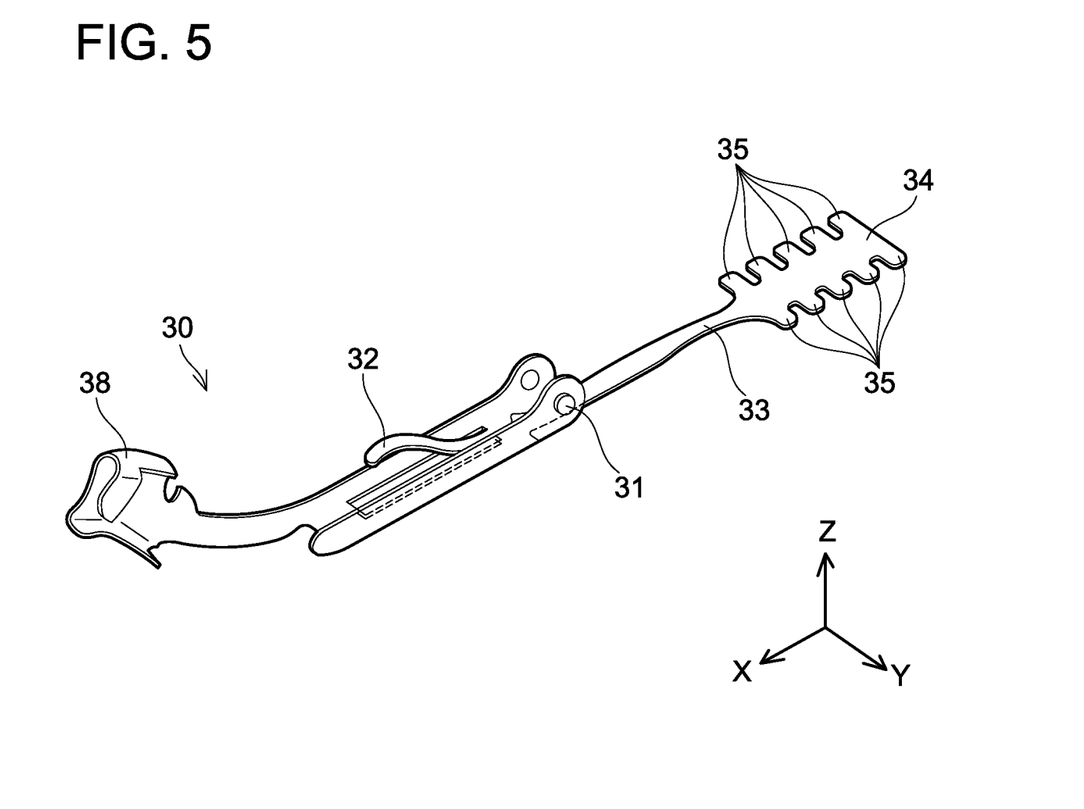
FIG. 5 is a perspective view of the lock lever.

A shape of the lock lever 30 will be described. FIG. 4 shows a cross section along a line IV-IV in FIG. 2A, and FIG. 5 shows a perspective view of the lock lever 30 (with the control lever omitted). The lock lever 30 will be described with reference to FIGS. 2 to 5. The lock lever 30 is an elongate metal plate and is arranged along the rail longitudinal direction. As described above, the lock lever 30 is supported by the axial protrusions 31 engaging with the through holes 22a provided in the upper rail 20. The lock lever 30 is configured to swing about the center line of the through holes 22a of the upper rail 20 (pivot line RL). A rear spring arm portion 33 extends rearward from a vicinity of the axial protrusions 31 and has its distal end connected to a protrusion-supporting portion 34. The protrusion-supporting portion 34 is located at the same location in the rail longitudinal direction as the windows 25 provided in the side plate portions 22 of the upper rail 20. A plurality of lock protrusions 35 protrudes from each of both edges of the protrusion-supporting portion 34 along the rail short direction (Y direction). FIG. 4 is a cross section passing through the kick protrusions 35. As shown in FIG. 4, the lock protrusions 35 extend outward beyond the side plate portions 22 in the rail short direction through the windows 25 of the upper rail 20 and are engaged with some of the grooves 15. When the lock protrusions 35 of the lock lever 30 supported by the upper rail 20 engage with the grooves 15 provided in the lower rail 10, the upper rail 20 is locked relative to the lower rail 10.

A front spring arm portion 32 extends frontward from a vicinity of the axial protrusions 31. As shown in FIGS. 2A and 5, the front spring arm portion 32 is curved upward. Further, as shown in FIG. 2A, the front spring arm portion 32 contacts a lower surface of the top plate portion 21 of the upper rail 20. An entirety of the lock lever 30 is constituted of a spring material having elasticity in swinging directions, which includes a direction bringing the lock protrusions 35 close to the grooves 15 and a direction bringing the lock protrusions 35 away from the grooves 15, and the front spring arm portion 32 is deformed by being pressed against the lower surface of the top plate portion 21. When the front spring arm portion 32 is pressed against the top plate portion 21, the lock lever 30 is biased downward at a portion thereof on a front side relative to the axial protrusions 31 and is biased upward at a portion thereof on a rear side relative to the axial protrusions 31. By this biasing force, the lock protrusions 35 are pressed against bottoms of the grooves 15. The biasing force of the front spring arm portion 32 maintains the engaged state of the lock protrusions 35 and the grooves 15. The lock lever 30 is constituted of, for example, a steel material identified by the steel standard (JIS standard) SK85.

A fitting portion 38 is provided at a front end of the lock lever 30, and the control lever 39 is fitted to the fitting portion 38 and thereby fixed. When the user lifts up the control lever 39, the lock lever 30 is lifted up at the front side relative to the axial protrusions 31 against the biasing force of the front spring arm portion 32, and the lock lever 30 is lowered at the rear side relative to the axial protrusions 31. The protrusion-supporting portion 34 at the rear end of the lock lever 30 thereby swings downward. The lock protrusions 35 move downward together with the downward swing of the protrusion-supporting portion 34, by which the lock protrusions 35 come out of the grooves 15 and the locked state of the upper rail 20 is released.

Figure 6A:
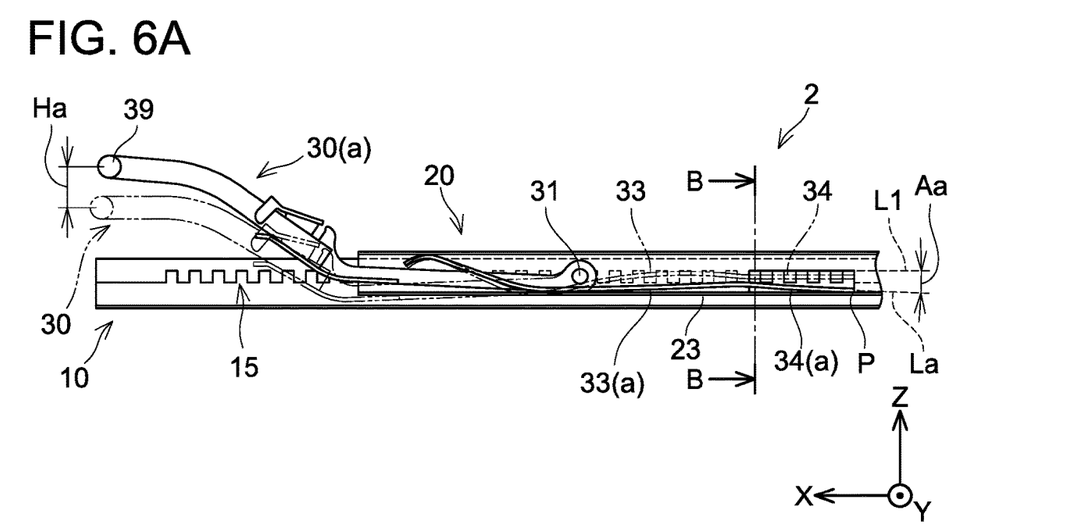
FIG. 6A is a partial side view of the seat slider device while a control lever is being pulled up (the rails are shown in their cross-sections).
Figure 6B:
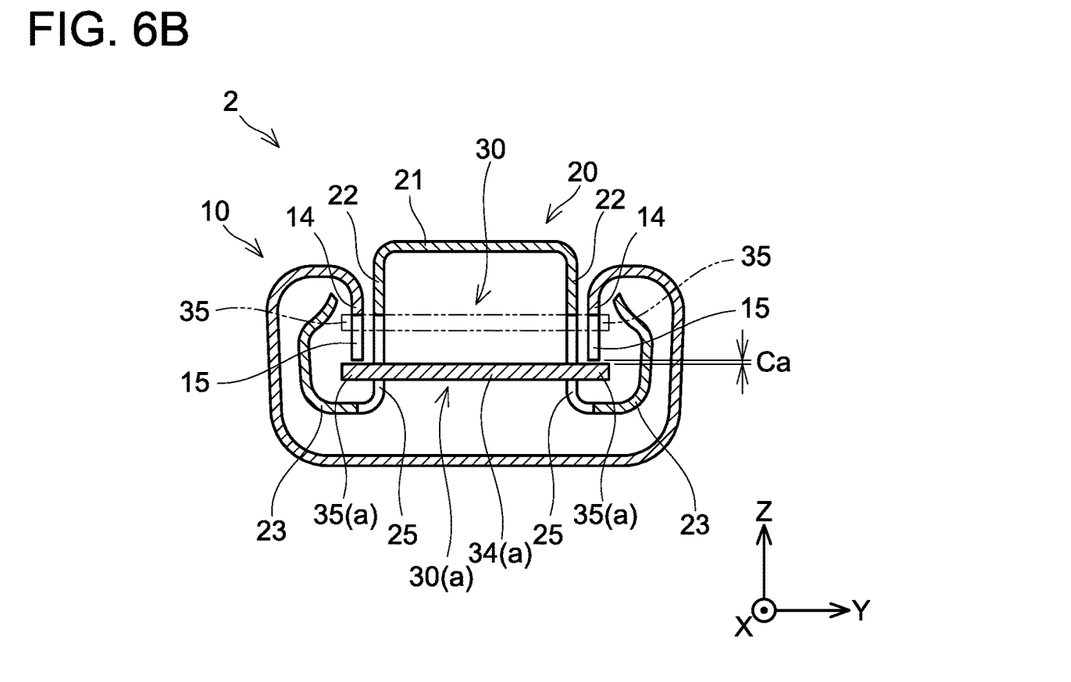
FIG. 6B is a cross-sectional view along a line B-B in FIG. 6A.

A series of motions of the lock lever 30 from the locked state until the lock is released will be described. FIG. 2A shows the locked state. FIG. 6A is a partial side view of the seat slider device 2 while the control lever 39 is being pulled up (with the rails shown in their cross-sections). FIG. 6B is a cross-sectional view along a line B-B in FIG. 6A. FIG. 6B shows a cross section that passes through frontmost lock protrusions 35 among the plurality of lock protrusions 35. In FIG. 6, the lock lever 30 in the locked state is shown by a virtual line, and the lock lever 30 being pulled up is shown by a solid line. Further, the lock lever 30 and the respective portions thereof being pulled up are with "(a)" added to their reference signs to distinguish them from the respective portions in the locked state.

FIG. 6 show a state in which the control lever 39 has been pulled up by a distance Ha. At this occasion, the lock lever 30 swings about the axial protrusions 31 such that its rear end is lowered. FIG. 6A shows a state in which a rear end P of the lock lever 30 contacts the lower plate portions 23 of the upper rail 20. The lower plate portions 23 are portions opposed to the grooves 15 with the lock protrusions 35 interposed therebetween. A broken line L1 in FIG. 6A is a straight line along a direction in which the grooves 15 are arranged, and a broken line La is a straight line along a direction in which the plurality of lock protrusions 35 is arranged. In the state in which the rear end P contacts the lower plate portions 23 as a result of the swing of the lock lever 30, the broken line L1 and the broken line La form an angle Aa. That is, a row of the lock protrusions 35 has the angle Aa relative to the direction in which the grooves 15 are arranged. As a result, even when the rear end P of the lock lever 30 contacts the lower plate portions 23, the frontmost lock protrusions 35 do not contact the lower plate portions 23 and are located in a vicinity of the grooves 15 as shown in FIG. 6B. FIG. 6B indicates that a shortest distance Ca between the grooves 15 and the lock protrusions 35 is very small. When the upper rail 20 is slid in the state of FIG. 6B, there is a risk that the frontmost lock protrusions 35 may interfere with the grooves 15 of the lower rail 10. If the frontmost lock protrusions 35 interfere with the grooves 15, the upper rail 20 (that is, the seat 90) may not move smoothly.

As described above, the entirety of the lock lever 30 has elasticity in the swinging directions. Due to this, when the control lever 39 is further lifted upward even after the rear end P of the lock lever 30 has contacted the lower plate portions 23, the entirety of the lock lever 30 elastically deforms. FIG. 6A shows a state in which the rear spring arm portion 33 has deformed from a shape indicated by a virtual line to a shape of a reference sign 33(a).

Figure 7A:
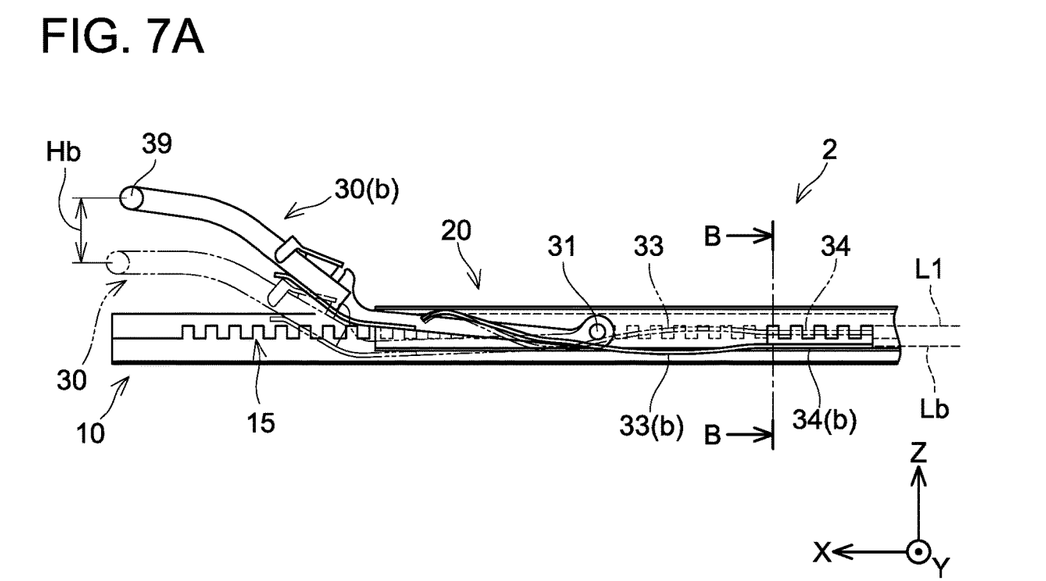
FIG. 7A is the partial side view of the seat slider device when the control lever has been completely pulled up (the rails are shown in their cross-sections).
Figure 7B:
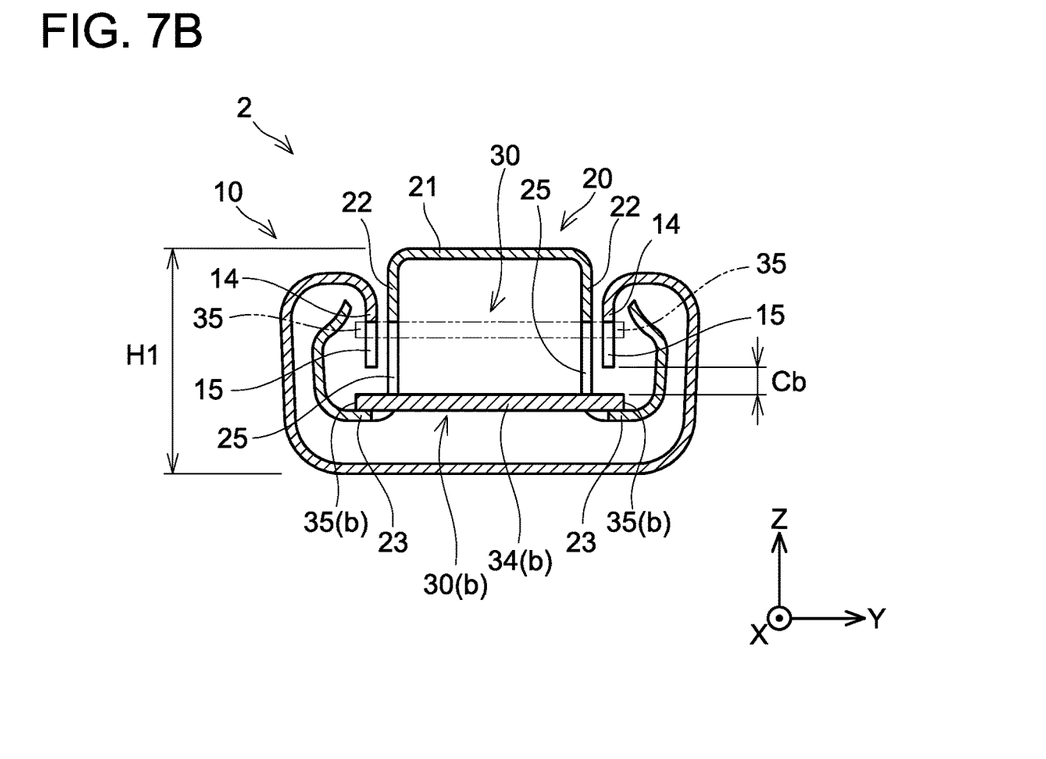
FIG. 7B is a cross-sectional view along a line B-B in FIG. 7A.

FIG. 7 show a state in which the control lever 39 has further been lifted up than the state shown in FIG. 6. FIG. 7A is a partial side view of the seat slider device 2 when the control lever 39 has been completely pulled up (with the rails shown in their cross-sections). FIG. 7A shows a state in which the control lever 39 has been lifted up by a distance Hb, which is even larger than the distance Ha in the case of FIG. 6A. FIG. 7B is a cross-sectional, view along a line B-B in FIG. 7A. FIG. 7B shows a cross section that passes through the frontmost lock protrusions 35 among the plurality of lock protrusions 35, as in FIG. 6B. In FIG. 7, the lock lever 30 in the locked state is shown by a virtual line, and the lock lever 30 having been completely pulled up is shown by a solid line. Further, the lock lever 30 and the respective portions thereof having been completely pulled up are with "(b)" added to their reference signs to distinguish them from the respective portions in the locked state and in the state while being pulled up.

Since the control lever 39 has been pulled up further than the state of FIG. 6, the rear spring arm portion 33(*b*) is further deformed. As a result, a front end of the protrusion-supporting portion 34 (that is, the frontmost lock protrusions 35) moves downward while the rear end P of the protrusion-supporting portion 34 is maintained in contact with the lower plate portions 23. A broken line L1 indicates the direction in which the grooves 15 are arranged as in FIG. 6A, and a broken line Lb indicates the direction in which the plurality of lock protrusions 35 is arranged. The front end of the protrusion-supporting portion 34 is lowered, and the frontmost lock protrusions 35 are thereby also in contact with the lower plate portions 23. As a result, the broken line L1 and the broken line Lb are approximately parallel to each other. That is, all of the lock protrusions 35 are located farthest away from the grooves 15. As shown in FIG. 7B, a distance Cb between the frontmost lock protrusions 35 and the grooves 15 is significantly larger as compared to the distance Ca in the case of FIG. 6. That is, a sufficient clearance is ensured between all the lock protrusions 35 and the grooves 15. As a result, the upper rail 20 can be slid without the lock protrusions 35 interfering with the grooves 15.

By the deformation of the rear spring arm portion 33 between the axial protrusions 31 (that is, the pivot line RL) of the lock lever 30 and the protrusion-supporting portion 34 (the lock protrusions 35), the protrusion-supporting portion 34 is brought to be approximately parallel to the grooves 15 and all the lock protrusions 35 are separated away from the grooves 15. Due to this, a cross-sectional area of the seat slider device 2, especially a height H1 shown in FIG. 7B, can be reduced.

A tolerable upper limit load is set for force with which the control lever 39 is operated. The upper limit load is set to a magnitude with which the seat slider device 2 will not be broken. In other words, the tolerable upper limit load is an upper limit of load required to release the lock of the upper rail 20. That is, the lock lever 30 swings in the direction bringing the lock protrusions 35 away from the grooves 15 by a load that is equal to or under the tolerable upper limit load, by which the lock protrusions 35 contact the portions opposed to the grooves 15 and the lock lever 30 further flexes such that the row of the plurality of lock protrusions 35 and the grooves 15 become approximately parallel to each other. As a result, the clearance is ensured between the grooves 15 and the plurality of lock protrusions 35.

Figure 8A:
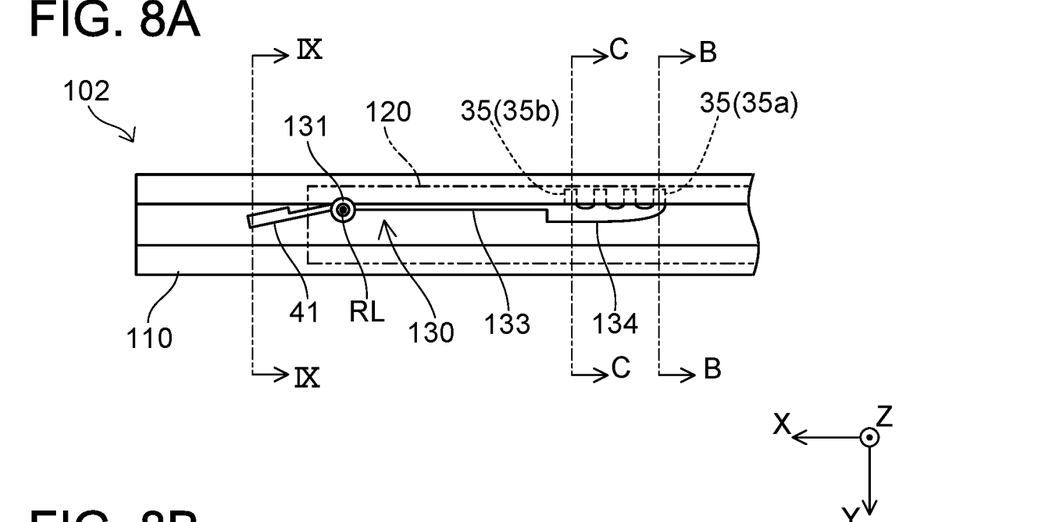
FIG. 8A is a plan view of a seat slider device of a second embodiment.
Figure 8B:
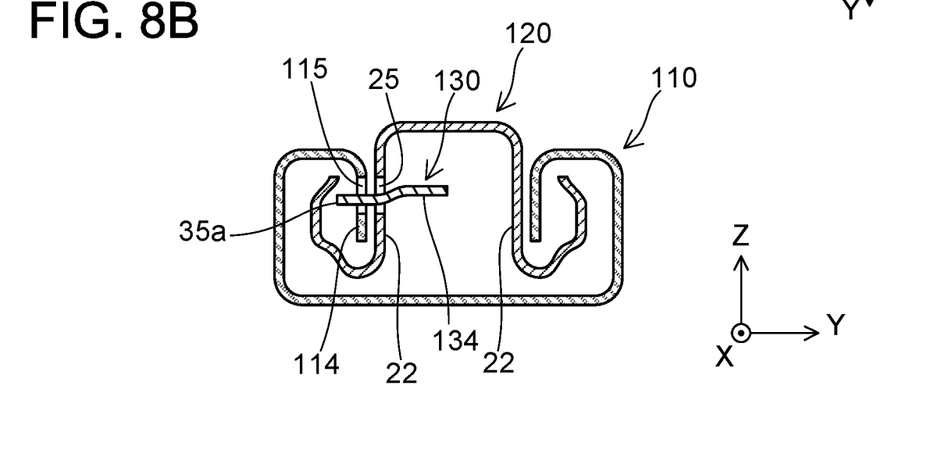
FIG. 8B is a cross-sectional view along a line B-B in FIG. 8A.
Figure 8C:
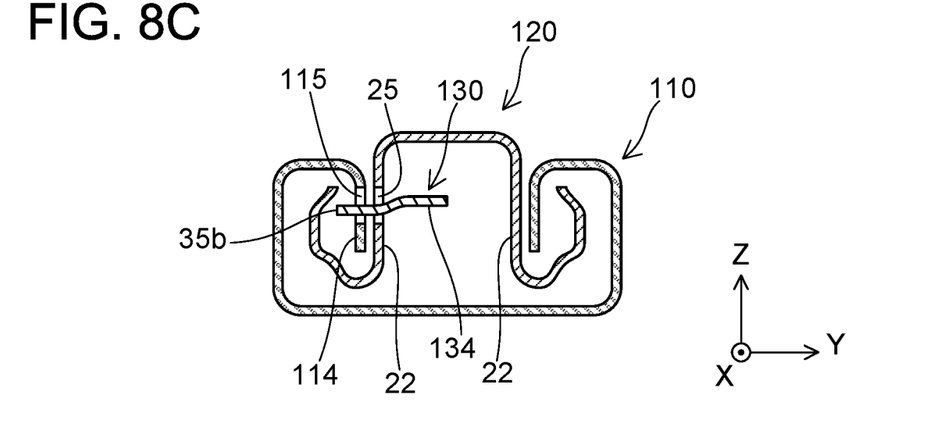
FIG. 8C is a cross-sectional view along a line C-C in FIG. 8A.

(Second Embodiment) A seat slider device 102 of a second embodiment will be described with reference to FIGS. 8 to 11. FIG. 8A is a plan view of the seat slider device 102, FIG. 8B is a cross-sectional view along a line B-B in FIG. 8A, and FIG. 8C is a cross-sectional view along a line C-C in FIG. 8A. The seat slider device 102 includes a lower rail 110 attachable to a body of a vehicle, an upper rail 120 attachable to a lower portion of a seat, and a lock lever 130. In FIG. 8A, the upper rail 120 is depicted schematically with a virtual line.

One of inner vertical plate portions 114 of the lower rail 110 (the inner vertical plate portion 114 on the left in FIGS. 8B and 8C) is provided with grooves 115 arranged along a rail longitudinal direction. The grooves 115 are a plurality of through holes provided in the inner vertical plate portion 114.

The lock lever 130 is supported swingably by the upper rail 120. The lock lever 130 has its axial protrusions 131 axially supported by the upper rail 120 and is configured to swing about a pivot line RL extending in a vertical direction. That is, the lock lever 130 is configured to swing in a horizontal direction. A spring arm portion 133 extends rearward from a vicinity of the axial protrusions 131 and has its distal end connected to a protrusion-supporting portion 134. The spring arm portion 133 is constituted of, for example, a steel material identified by the steel standard (JIS standard) SK85, and is configured to flex in swinging directions of the lock lever 130, which include a direction bringing protrusions close to the grooves 115 and in a direction bringing the protrusions away from the grooves 115, by force that is equal to or under an upper limit value of a load which a user applies.

The protrusion-supporting portion 134 is located at the same location in the rail longitudinal direction as a window 25 provided in one of side plate portions 22 of the upper rail 120 (see FIGS. 8B and 8C). A plurality of lock protrusions 35 protrudes in a rail outer direction along an edge of the protrusion-supporting portion 134. A rearmost lock protrusion is denoted with a reference sign 35a, and a frontmost lock protrusion is denoted with a reference sign 35b. FIG. 8B shows a cross section passing through the rearmost lock protrusion 35a, and FIG. 8C shows a cross section passing through the frontmost lock protrusion 35b. As shown in FIGS. 8B and 8C, the lock protrusions 35 extend outward in the rail short direction beyond the side plate portion 22 through the window 25 of the upper rail 120, and are configured to be engaged with the grooves 115. When the lock protrusions 35 of the lock lever 130 supported by the upper rail 120 engage with the grooves 115 provided in the lower rail 110, the upper rail 120 is locked relative to the lower rail 110.

Although not shown, the lock lever 130 is biased such that the protrusion-supporting portion 134 is pressed against the grooves 115. This biasing force maintains an engaged state of the lock protrusions 35 of the lock lever 130 and the grooves 115 of the lower rail 110.

Figure 9A:
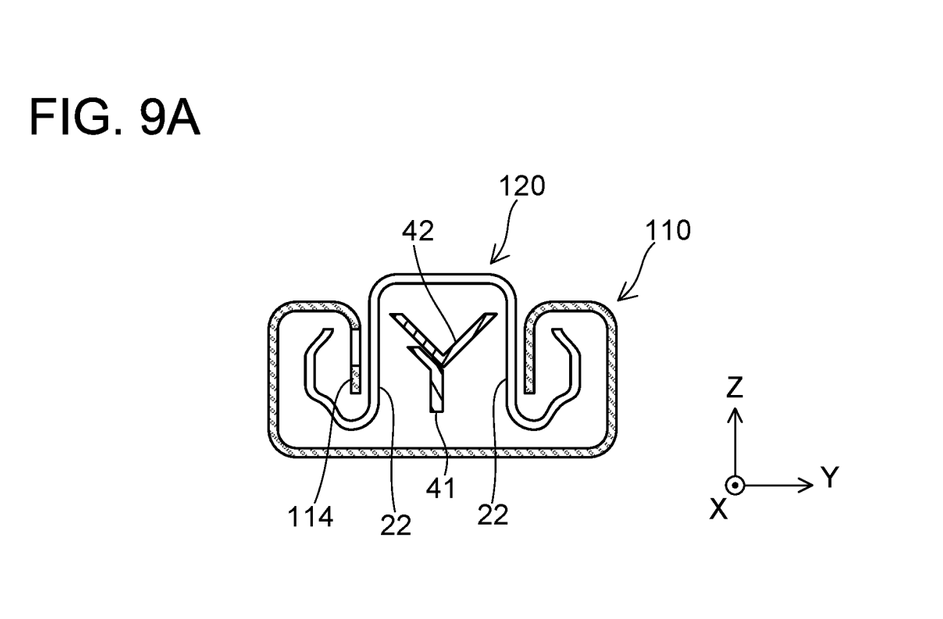
FIG. 9A is a cross-sectional view along a line IX-IX in FIG. 8A (with a second lever lifted up).
Figure 9B:
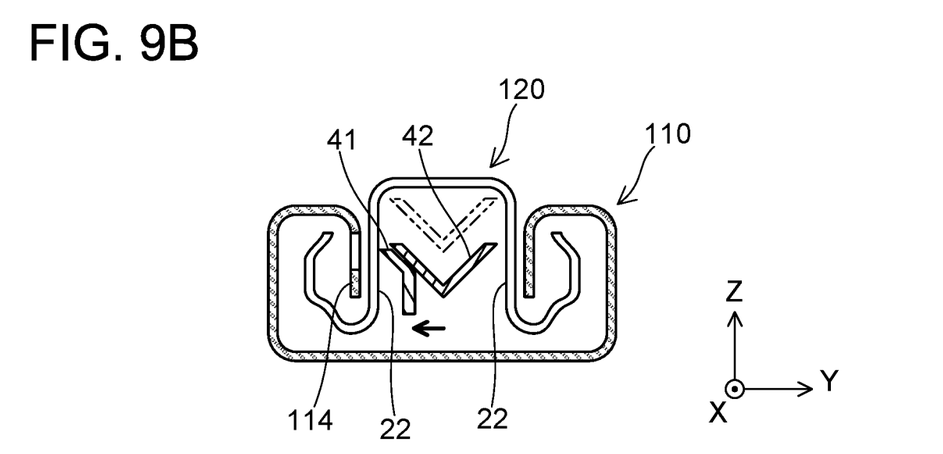
FIG. 9B is the cross-sectional view along the line IX-IX in FIG. 8A (with the second lever lowered).

A first lever 41 extends frontward from the axial protrusions 131. Although not shown in FIG. 8, a second lever 42 (to be described later) is supported by the upper rail 120 above the first lever 41. The second lever 42 is configured to swing in the vertical direction in cooperation with a control lever that is not shown. FIGS. 9A and 9B show cross sections along a line IX-IX in FIG. 8A. The second lever 42 is a metal plate that is bent in a V-shape. The first lever 41 has its upper end portion bent such that the upper end portion opposes one of surfaces of the second lever 42 that define the V-shape. When the second lever 42 is lowered, the first lever 41 is pressed by the V-shaped surface of the second lever 42 and is moved outward in the rail short direction. A bold arrow in FIG. 9B shows the movement of the first lever 41. When the user operates the control lever that is not shown, the second lever 42 is lowered and the first lever 41 is moved outward in the rail short direction. Since the first lever 41 constitutes a part of the lock lever 130, the lock lever 130 thereby swings. As the first lever 41 moves outward in the rail short direction, the protrusion-supporting portion 134 moves toward a center in the rail short direction.

Figure 10A:
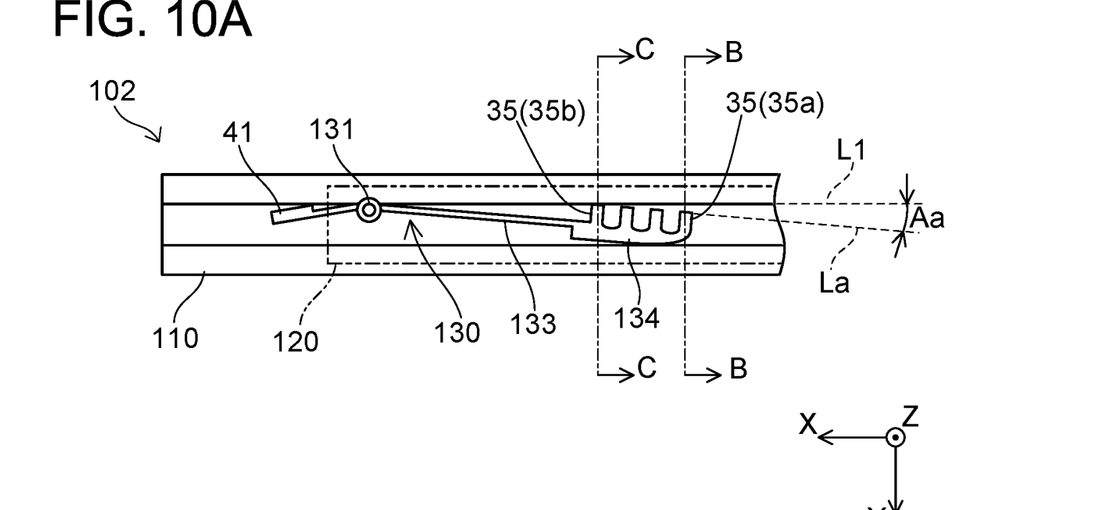
FIG. 10A is a plan view of the seat slider device while a control lever is being pulled up.
Figure 10B:
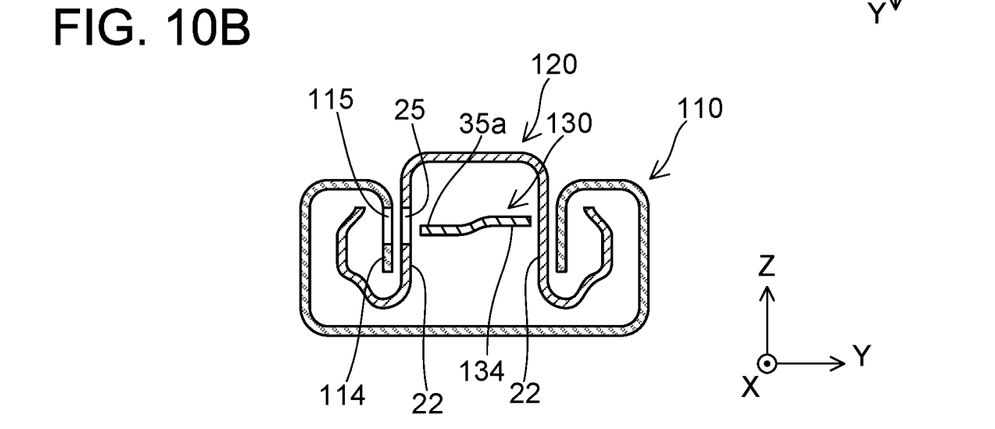
FIG. 10B is a B-B cross section in FIG. 10A.
Figure 10C:
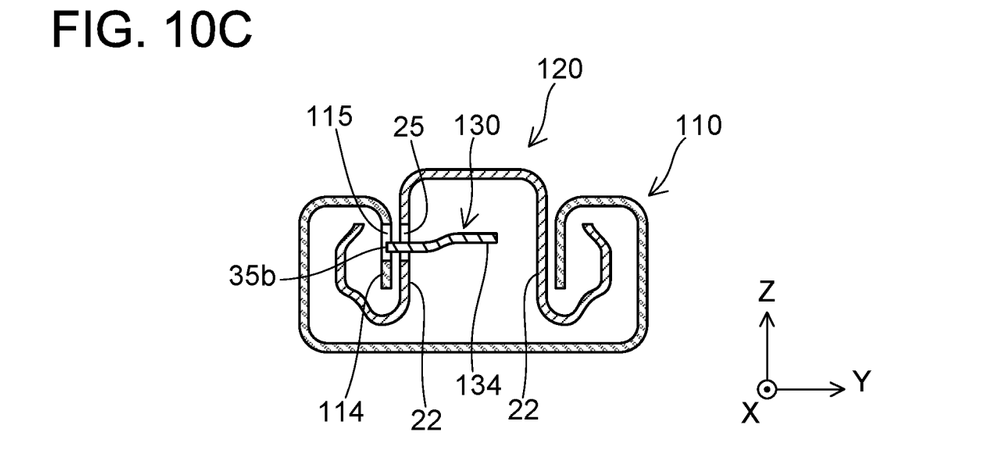
FIG. 10C is a C-C cross section in FIG. 10A.

FIG. 10A is a plan view of the seat slider device 102 while the control lever that is not shown is being pulled up. FIGS. 10B and 10C are respectively a B-B cross-sectional view and a C-C cross-sectional view in FIG. 10A. FIG. 10B shows a cross section passing through the rearmost lock protrusion 35a and FIG. 10C shows a cross section passing through the frontmost lock protrusion 35*b*. FIG. 10 are diagrams showing a state in which a back of the protrusion-supporting portion 134 (an edge of the protrusion-supporting portion 134 that is opposite the edge thereof where the lock protrusions 35 are provided) contacts a member. Specifically, as FIG. 10B shows, the back of the protrusion-supporting portion 134 contacts the other of side plate portions 22 of the upper rail 120 (the side plate portion 22 that is not provided with the window 25).

In FIG. 10A, a broken line L1 is a straight line along a direction in which the grooves 115 are arranged, and a broken line La is a straight line along a direction in which the plurality of lock protrusions 35 is arranged. The broken line L1 and the broken line La form an angle Aa. That is, a row of the lock protrusions 35 has the angle Aa relative to the direction in which the grooves 115 are arranged. As a result, the rearmost lock protrusion 35*a* is receded inward than the window 25 of the upper rail 120 as shown in FIG. 10B, while the frontmost lock protrusion 35*b* interferes with the groove 115 as shown in FIG. 10C. When the upper rail 120 is slid in the state of FIG. 10C, there is a risk that the frontmost lock protrusion 35*b* may interfere with the lower rail 110. If the frontmost lock protrusion 35*b* interferes with the lower rail 110, the upper rail 120 (that is, the seat 90) may not move smoothly.

Figure 11A:
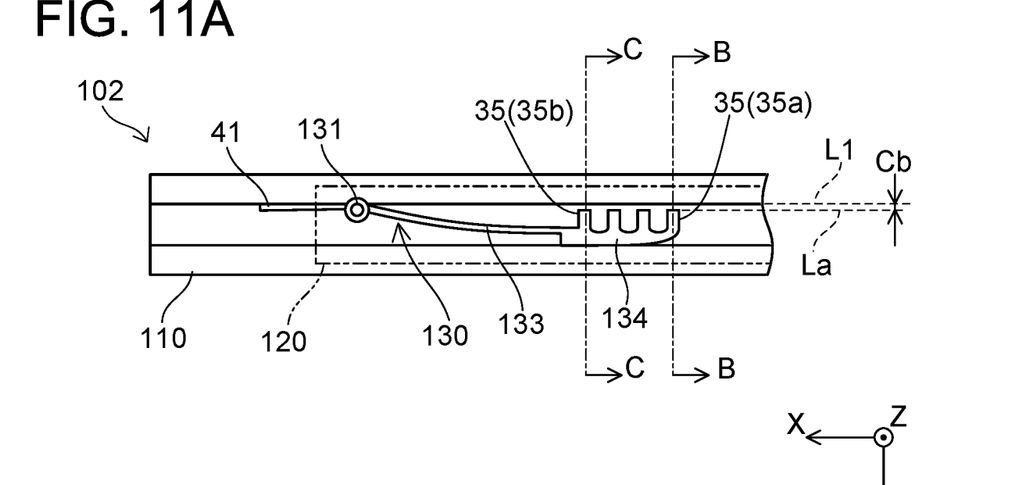
FIG. 11A is the plan view of the seat slider device when the control lever has been completely pulled up.
Figure 11B:
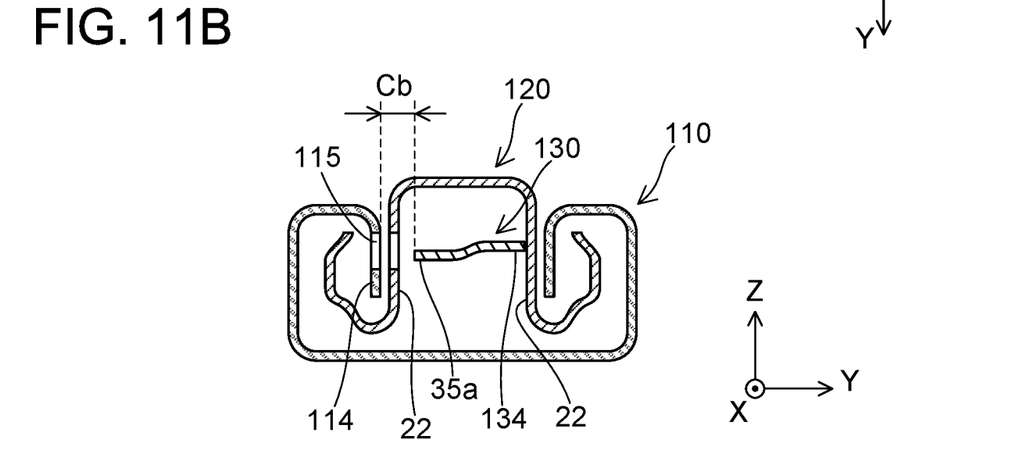
FIG. 11B is a B-B cross section in FIG. 11A.
Figure 11C:
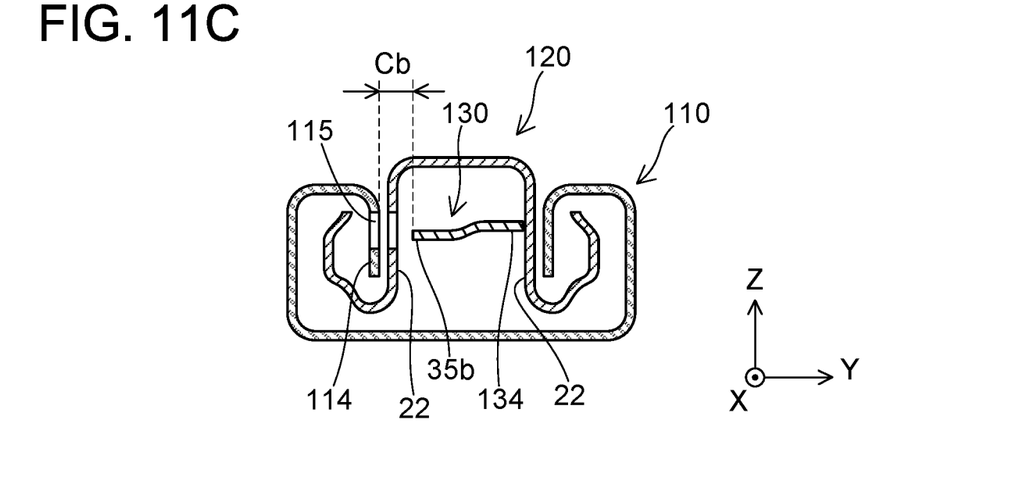
FIG. 11C is a C-C cross section in FIG. 11A.

FIG. 11A is a plan view of the seat slider device 102 when the control lever that is not shown has been completely pulled up. FIGS. 11B and 11C are respectively a B-B cross-sectional view and a C-C cross-sectional view in FIG. 11A. FIG. 11B shows a cross section passing through the rearmost lock protrusion 35*a*, and FIG. 11C shows a cross section passing through the frontmost lock protrusion 35*b*. In FIG. 11A, the spring arm portion 133 is flexed in the swinging direction of the lock lever 130, and the direction in which the plurality of lock protrusions 35 is arranged (direction of the broken line La) is thereby approximately parallel to the direction in which the grooves 115 are arranged (the broken line L1). As such, a space Cb (clearance) is ensured between all the lock protrusions 35 including the frontmost lock protrusion 35*b* and the grooves 115. As a result, the upper rail 120 can smoothly be slid.

In the seat slider device 102 of the second embodiment, the lock lever 130 is configured to swing about the pivot line RL extending in the vertical direction. As shown in FIGS. 11B and 11C, the lock lever 130 can swing until the back of the protrusion-supporting portion 134 contacts the side plate portion 22 opposite to the lock protrusions 35. As shown in FIG. 10, before the spring arm portion 133 flexes, the direction in which the plurality of lock protrusions 35 is arranged (the broken line La) is inclined relative to the direction in which the grooves 115 are arranged (the broken line L1), so there is the risk that the frontmost lock protrusion 35*b* may interfere with the grooves 115. However, when the spring arm portion 133 is flexed in the swinging direction of the lock lever 130, the direction in which the plurality of lock protrusions 35 is arranged becomes approximately parallel to the direction in which the grooves 115 are arranged and the sufficient space (clearance) is thereby ensured between the frontmost lock protrusion 35*b* and the grooves 115 as well. Due to this, in the seat slider device 102 of the second embodiment, a cross-sectional area thereof, especially a width thereof in the rail short direction, can be reduced. The spring arm portion 133 has elasticity that allows it to flex by a load that is equal to or under a tolerable upper limit load for moving the lock lever 130.

As described above, the seat slider device 2 (102) of the embodiment can achieve both the reduction of the rail cross-sectional area and the securement of the sufficient clearance between the lock protrusions 35 and the grooves 15 (115).

Figure 12A:
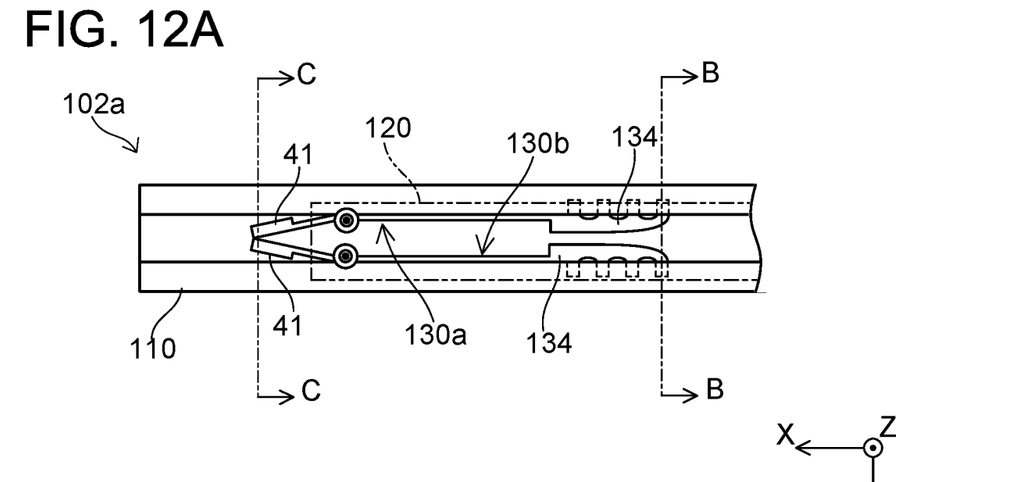
FIG. 12A is a plan view of a seat slider device of a variant.
Figure 12B:
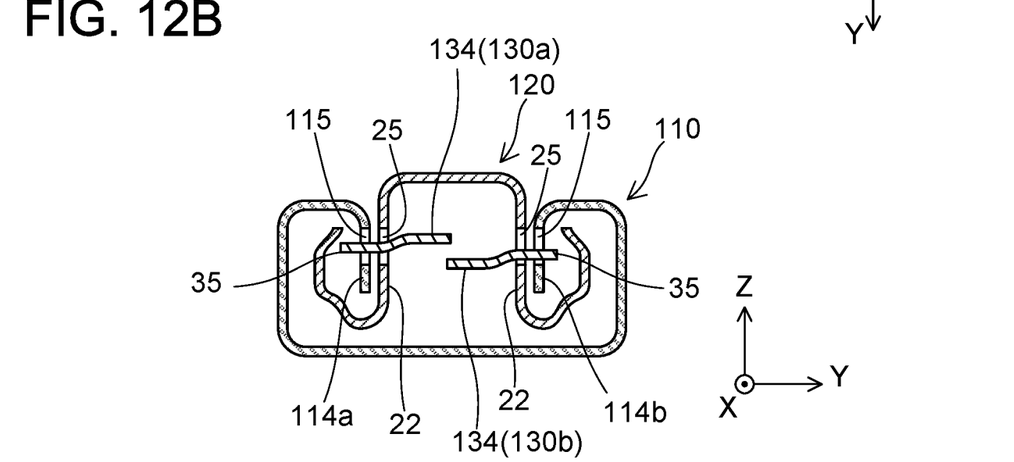
FIG. 12B is a B-B cross section in FIG. 12A.
Figure 12C:
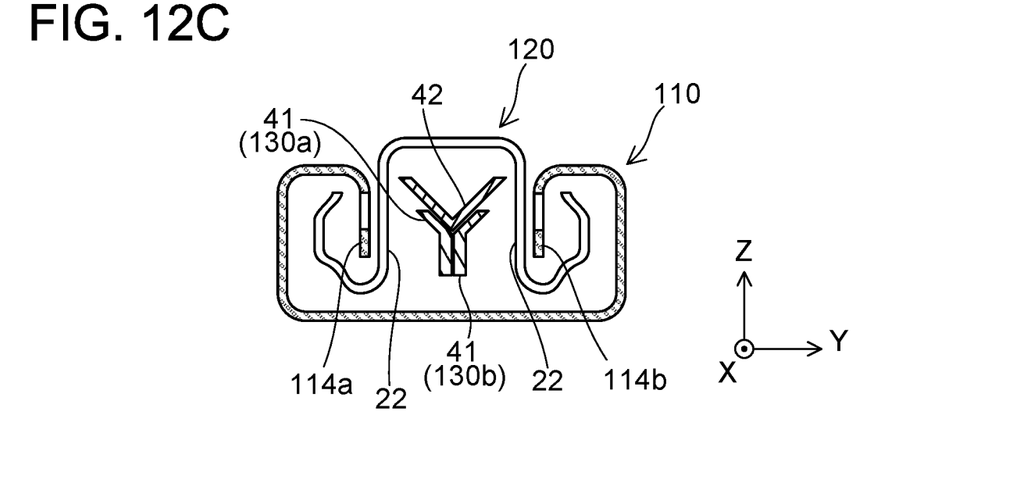
FIG. 12C is a C-C cross section in FIG. 12A.

(Variant) A seat slider device 102*a* of a variant of the second embodiment will be described with reference to FIG. 12. FIG. 12A shows a plan view of the seat slider device 102*a*. FIGS. 12B and 12C respectively show cross-sectional views along a line B-B and a line C-C in FIG. 12A. The seat slider device 102*a* is a variant of the seat slider device 102 of the second embodiment, and includes two lock levers 130*a*, 130*b*. The two lock levers 130*a*, 130*b* are arranged so as to have a line symmetry relationship in a rail short direction.

The grooves 115 are provided in each of the pair of inner vertical plate portions 114 of the lower rail 110. Lock protrusions 35 of the lock lover 130*a* are configured to engage with the grooves 115 in one of the inner vertical plate portions 114*a* and lock protrusions 35 of the lock lever 130*b* are configured to engage with the grooves 115 in the other one of the inner vertical plate portions 114*a*. As shown in FIG. 12B, a protrusion-supporting portion 134 of the lock lever 130*a* and a protrusion-supporting portion 134 of the lock lever 130*b* are offset with respect to each other in the vertical direction. Due to this, the protrusion-supporting portions 134 of the lock levers 130*a*, 130*b* can swing without interfering with each other.

Further, as shown in FIG. 12C, first levers 41 of the lock levers 130*a*, 130*b* have their upper portions bent in opposite directions and are opposed to the V-shape surfaces of the second lever 42. When the second lever 42 is lowered, the lock levers 130*a*, 130*b* move in opposite directions from each other. These movements swing the lock levers 130*a*, 130*b* in the opposite directions from each other. The movement of the lock lever 130*a* is the same as the movement of the lock lever 130 of the seat slider device 102 of the second embodiment. The movement of the lock lever 130*b* is a movement symmetric to the movement of the lock lever 130*a* in a horizontal direction. Thus, the description on their movements will be omitted.

Specific examples of the present disclosure have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A seat slider device comprising:
    a lower rail configured to be attached to a body of a vehicle, the lower rail including a plurality of grooves arranged in a longitudinal direction of the lower rail;
    an upper rail configured to be attached to a seat, the upper rail being slidable with respect to the lower rail; and
    a lock lever arranged in the upper rail, the lock lever including:
        a distal end including a plurality of protrusions and a protrusion-supporting portion, the plurality of protrusions being configured to engage with the plurality of grooves, the protrusion-supporting portion supporting the plurality of protrusions, two axial protrusions engaging with the upper rail such that the lock lever is configured to swing about a pivot axis defined by the two axial protrusions, a front spring arm portion biasing the lock lever such that the plurality of protrusions are configured to engage with the plurality of grooves, and a flex portion arranged between the protrusion-supporting portion and the front spring arm portion such that the protrusion-supporting portion is configured to move with respect to the front spring arm portion, wherein the lock lever is configured to swing in a direction bringing the plurality of protrusions towards the plurality of grooves and in a direction bringing the plurality of protrusions away from the plurality of grooves, the lock lever being biased in the direction bringing the plurality of protrusions towards the plurality of grooves, the flex portion has an elasticity such that the flex portion is configured to flex in the direction bringing the plurality of protrusions towards the plurality of grooves and in the direction bringing the plurality of protrusions away from the plurality of grooves, and when a load that is less than or equal to a predetermined upper limit load is applied to the lock lever in the direction bringing the plurality of protrusions away from the plurality of grooves, the distal end of the lock lever contacts a portion opposed to the plurality of grooves and the flex portion flexes such that each of the plurality of protrusions of the distal end contacts the portion opposed to the plurality of grooves with a clearance between the plurality of protrusions and the plurality of grooves.

2. The seat slider device of claim 1, further comprising a control lever configured to be handled by a user at a position opposite to the plurality of protrusions with respect to the pivot axis in the longitudinal direction.

3. The seat slider device of claim 1, wherein when a threshold load is applied to the lock lever and the distal end of the lock lever contacts the portion opposed to the plurality of grooves, the flex portion curves convexly downward.

* * * * *